United States Patent
Wang et al.

(10) Patent No.: US 11,280,955 B2
(45) Date of Patent: Mar. 22, 2022

(54) WEARABLE DEVICE AND METHOD FOR CONTROLLING WEARABLE DEVICE

(71) Applicant: BOE Technology Group Co., Ltd., Beijing (CN)

(72) Inventors: Long Wang, Beijing (CN); Mengjun Hou, Beijing (CN); Tuo Sun, Beijing (CN); Nanfang Jia, Beijing (CN); Zongmin Liu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 67 days.

(21) Appl. No.: 16/756,106

(22) PCT Filed: Dec. 5, 2019

(86) PCT No.: PCT/CN2019/123272
§ 371 (c)(1),
(2) Date: Apr. 14, 2020

(87) PCT Pub. No.: WO2020/164297
PCT Pub. Date: Aug. 20, 2020

(65) Prior Publication Data
US 2021/0239897 A1    Aug. 5, 2021

(30) Foreign Application Priority Data

Feb. 13, 2019 (CN) .......................... 201910116596.4

(51) Int. Cl.
*F21V 8/00* (2006.01)
*G02F 1/133* (2006.01)
(Continued)

(52) U.S. Cl.
CPC ......... *G02B 6/0055* (2013.01); *G02B 6/0035* (2013.01); *G02B 6/0085* (2013.01);
(Continued)

(58) Field of Classification Search
CPC .. G02B 6/0055; G02B 6/0035; G02B 6/0085; G02B 6/00; G02F 1/13306;
(Continued)

(56) References Cited

U.S. PATENT DOCUMENTS

2017/0075314 A1* 3/2017 Perez-Feliciano ... G04G 9/0064

FOREIGN PATENT DOCUMENTS

CN         202327888 U      7/2012
CN         106526898 A      3/2017
(Continued)

OTHER PUBLICATIONS

First Office Action issued to Chinese Application No. 201910116596.4 dated Mar. 20, 2020 with English translation (16p).
(Continued)

*Primary Examiner* — Joseph L Williams
*Assistant Examiner* — Jose M Diaz
(74) *Attorney, Agent, or Firm* — Arch & Lake LLP (57) ABSTRACT

A wearable device is provided, including: a main body; a display panel over the main body for displaying information; and a driving circuit coupled to the display panel, where the driving circuit is configured to control the display panel to switch between: a transparent non-displaying state in which the main body is viewable by a user, and a displaying state in which the information displayed is viewable by the user.

19 Claims, 9 Drawing Sheets

(51) Int. Cl.
     *G02F 1/1333*     (2006.01)
     *G02F 1/1334*     (2006.01)

(52) U.S. Cl.
     CPC ........ *G02F 1/1334* (2013.01); *G02F 1/13306* (2013.01); *G02F 1/13338* (2013.01)

(58) Field of Classification Search
     CPC .. G02F 1/13338; G02F 1/1334; G02F 1/1333; G02F 1/13; G02F 1/01; G02F 1/15; G02F 1/29; G02F 1/35; G04G 9/0064; G04G 9/12; G04C 17/0091; G04B 47/00; G04B 19/06; G08B 5/228
     See application file for complete search history.

(56) References Cited

FOREIGN PATENT DOCUMENTS

| | | |
|---|---|---|
| CN | 106647049 A | 5/2017 |
| CN | 106908996 A | 6/2017 |

OTHER PUBLICATIONS

Second Office Action issued to Chinese Application No. 201910116596.4 dated Nov. 2, 2020 with English translation, (17p).
Chinese Office Action (including English Translation) issued in CN201910116596.4, dated Mar. 19, 2021, 9 pages.

\* cited by examiner

WEARABLE DEVICE AND METHOD FOR CONTROLLING WEARABLE DEVICE

CROSS-REFERENCE TO RELATED APPLICATIONS

This application is the U.S. national phase of PCT Patent Application No. PCT/CN2019/123272 filed on Dec. 5, 2019, which claims the priority of Chinese Patent Application No. 201910116596.4, filed on Feb. 13, 2019, the entire content of both of which is incorporated herein by reference in their entirety for all purposes.

FIELD

The present disclosure relates to the field of smart device technologies, and in particular, to a wearable device and a method of controlling a wearable device.

BACKGROUND

In recent years, smart wearable products, such as smart bracelets and smart watches of Apple, L G, and Huawei, etc. have been favored by consumers. Smart watches provide consumers with many new functions and experiences that are not offered by the traditional watches, but they also bring some troubles, such as short standby time. If used frequently, they need to be charged every day.

There are many causes for the short standby time of the products such as smart watches. For example, lighting up the screen every time a user views the content or time, displaying data obtained by various sensors (heart rate, steps, position, etc.) and other operations all cause huge consumption of power.

In the related art, some products use old-style black and white display screens in order to save power consumption, resulting in poor consumer experience.

SUMMARY

Embodiments of the present disclosure provide a wearable device.

According to a first aspect of the present disclosure, there is provided a wearable device, including: a main body; a display panel over the main body for displaying information; and a driving circuit coupled to the display panel; where the driving circuit is configured to control the display panel to switch between: a transparent non-displaying state in which the main body is viewable by a user, and a displaying state in which the information displayed is viewable by the user.

According to a second aspect of the present disclosure, there is provided a method for controlling a wearable device, the wearable device including: a main body; a display panel over the main body for displaying information; and a driving circuit coupled to the display panel, where the method comprises: controlling the display panel to switch between: a transparent non-displaying state in which the main body is viewable by a user, and a displaying state in which the information displayed is viewable by the user.

BRIEF DESCRIPTION OF THE DRAWINGS

A more particular description of the embodiments will be rendered by reference to specific embodiments illustrated in the appended drawings. Given that these drawings depict only some embodiments and are not therefore considered to be limiting in scope, the embodiments will be described and explained with additional specificity and details through the use of the accompanying drawings, in which.

DETAILED DESCRIPTION

The disclosure will be described hereinafter with reference to the accompanying drawings, which illustrate embodiments of the disclosure. The described embodiments are only exemplary embodiments of the present disclosure, but not all embodiments. Other variations may be derivable by a person of ordinary skill in the art based on the embodiments of the present disclosure without creative efforts, and are within the scope of the present disclosure.

References throughout the disclosure to "one embodiment", "an embodiment", "an example", "some embodiments", or similar language mean that a particular feature, structure, or characteristic described in connection with the embodiment is included in at least one embodiment. Thus, appearances of the phrases "in one embodiment", "in an embodiment", "in some embodiments", and similar language throughout the disclosure may, but do not necessarily, all refer to the same embodiment(s), but mean "one or more embodiments". These may or may not include all the embodiments disclosed. Accordingly, features or elements of some embodiments may be available in some other embodiments unless the context indicates otherwise.

Unless otherwise defined, technical terms or scientific terms used in the embodiments of the present disclosure should be construed in the ordinary meaning of the person of ordinary skill in the art.

The terms "first", "second" and similar terms used in the present disclosure do not denote any order, quantity, or importance. They are merely used for references to relevant devices, components, procedural steps, etc. These terms do not imply any spatial or chronological orders, unless expressly specified otherwise. For example, a "first device" and a "second device" may refer to two separately formed devices, or two parts or components of the same device. In some cases, for example, a "first device" and a "second device" may be identical, and may be named arbitrarily. Similarly, a "first step" of a method or process may be carried or performed before, after, or simultaneously with, a "second step".

The terms "comprising", "including", "having", and variations thereof mean "including but not limited to", unless expressly specified otherwise.

An enumerated listing of items does not imply that any or all of the items are mutually exclusive, unless expressly specified otherwise. The terms "a", "an", and "the" also refer to "one or more" unless expressly specified otherwise.

The words "connected" or "connection" and the like are not limited to physical or mechanical connections, but may include electrical connections, whether direct or indirect.

The word "over" is used only to indicate that a layer's relative position with respect to another layer. In some embodiments, this means that the layer is located further from a substrate or a reference position than the other layer. The layer may be in contact with the other layer in some embodiments, and may be completely or partially separated from the other layer by a third layer or a void space in some other embodiments. Additionally, the layer may fully or partially cover the other layer in some embodiments, and may not cover or overlap with the other layer in some other embodiments. Accordingly, it does not necessarily require contact between the two layers, nor does it require the layer fully or partially covering the other layer.

The words "above", "below", "under", "upper", "lower", "left", "right", etc. may be used to refer to relative positions of an element under normal operation mode or installation orientation, to facilitate understanding of the relevant embodiments. The scope of the disclosure is not limited to the specific operation mode or installation orientation as described.

The drawings of the present disclosure relate only to structures involved in the present disclosure, and other structures may refer to the usual design.

Embodiments of the present disclosure provide a wearable device capable of ensuring the effect of displaying an image while retaining the usual functions and textures of the wearable device.

Figure 1:
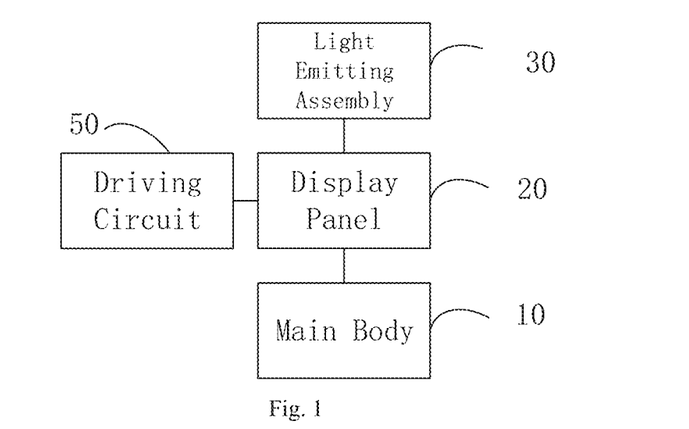
FIG. 1 is a schematic block diagram of a wearable device according to an embodiment.

As shown in FIG. 1, the wearable device includes: a main body 10, a display panel 20, and a light emitting assembly 30; the main body 10 is located on a side away from the display side of the display panel 20 (i.e., the display panel 20 is located at a side of the main body that is facing a user for displaying functions, or the display panel is over the main body for displaying information). In one embodiment, the display panel covers the main body. The light emitting assembly 30 includes a light source 31, and the light emitted by the light source 31 illuminates the display panel 20. The display panel 20 is coupled to a driving circuit 50 which is configured to control the display panel 20, e.g., applying a voltage to the display panel 20 or performing other control functions.

Optionally, the light emitting assembly 30 further includes a light guiding structure 32. The light guiding structure 32 is located at an outer edge of the display panel 20 and configured to guide the light emitted by the light source 31 to illuminate the display panel 20; and the light source 31 is located at at least one location in the light guiding structure 32.

Optionally, the light guiding structure may be alight guiding structure ring 32 that surrounds the outer edge of the display panel 20.

In an embodiment of the present disclosure, the main body 10 may refer to a hardware entity on which a function inherent to the wearable device itself relies, for example, a hardware entity that does not have a display function.

In some embodiments, the wearable device is a smart watch, and the main body 10 can be a mechanical structure such as a dial, a hand, or the like of a watch or a wrist watch (e.g., a mechanical watch, a quartz watch, a kinetic energy watch, etc.).

In some embodiments, the wearable device is smart glasses, and the main body 10 can be a mechanical structure composed of a frame, a lens, or the like.

The wearable device according to the embodiments integrates the display device into a device such as a watch or glasses, and can perform functions of the main body (such as time viewing, alarm clock setting, etc.) or display desired content (such as displaying human physiological parameters, displaying an SMS, and displaying a caller number, etc.) according to requirements, to minimize power consumption while meeting functional requirements.

In some embodiments, the light guiding structure maybe disposed on the outer side of the display panel, instead of below the display panel. This may reduce the influence of the light emitting assembly on the light transmittance of the display panel, so that the user's view of the conventional functions of the main body may not be severely affected by the display panel.

Figure 2:
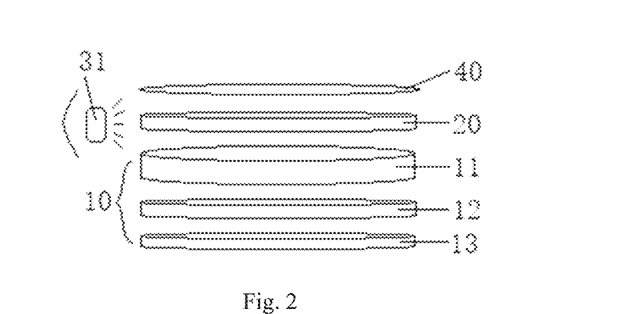
FIG. 2 is a schematic exploded view of a wearable device according to an embodiment.

Optionally, the main body 10 of the wearable device may have a multi-layer structure. As shown in FIG. 2, the main body 10 includes a first layer body 11 and a second layer body 12.

For example, the first layer body 11 may include hardware such as a hand, a dial, and a control module; the second layer body 12 may be a hardware device that supports hardware operation of the first layer body 11, such as a battery and its management module, and/or a motor.

Optionally, the main body 10 may further include a third layer body 13, which may be a sensor device layer for providing display content to the display panel 10. For example, the sensor device layer may integrate a photoelectric sensor, a pedometer sensor, an orientation sensor, pressure sensors, humidity sensors, etc., to assist in the detection of heart rate, pulse, blood oxygen, and other health parameters, exercise parameters, environmental parameters, etc.

The specific structure of the main body 10 herein is merely exemplary, and adaptations, additions and removals of components may be performed as needed in actual production.

In an embodiment of the present disclosure, some control units, battery units, battery management modules, and the like of the display panel 20 and the light emitting assembly 30 may also be disposed in the main body 10. Meanwhile, the surface of the display panel 20 may also be provided with a protective cover 40 for protecting the display panel 20.

Optionally, the display panel 20 is light transmissive as a whole to minimize the influence of the display panel itself on the user's view of the main body.

Optionally, the battery management module or the power management module is configured to manage the output power of the power source (e.g. battery) as needed. For example, the output power of the power source is divided into two parts and supplied to the main body, as well as the display panel and the sensors corresponding to the display content of the display panel. For example, about 80% of the power is distributed to the display panel and the sensors, and about 20% of the power is used to power the main body, such as powering the watch. For example, for a purely mechanical watch, the power of the power source may all be allocated to the display panel and the sensors corresponding to the display content of the display panel.

Optionally, the power source is wirelessly chargeable (for example, the battery may be connected to a wireless charging induction coil) for convenient charging.

Figure 3:
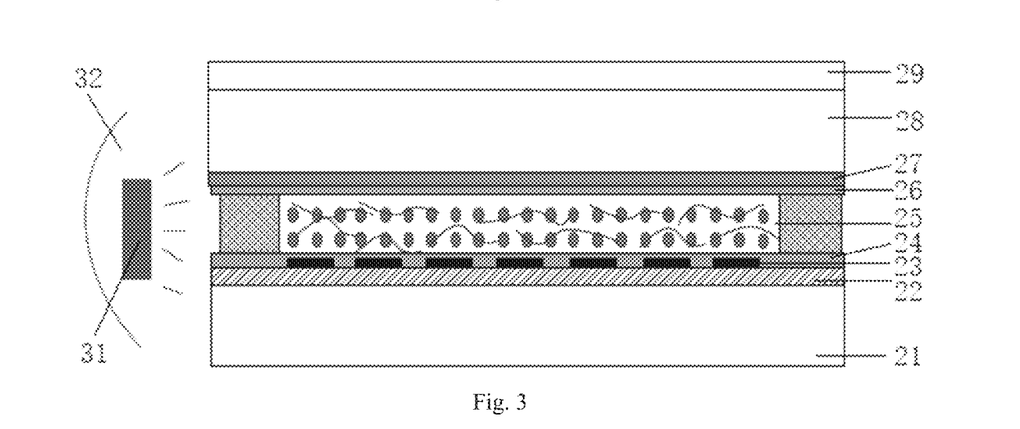
FIG. 3 is a schematic structural view of a display panel according to an embodiment.

As shown in FIG. 3, the display panel 20 according to an embodiment includes a first substrate 21, a thin film transistor array layer 22, a pixel electrode layer 23, a first alignment layer 24, a liquid crystal layer 25, and a second alignment layer 26, a common electrode layer 27, and a second substrate 28, that are sequentially disposed.

Optionally, the second substrate 28 is further provided with a touch layer 29, such that the display panel is a touch sensitive display panel. Thus, the user can operate the wearable device by touch. The light guiding structure 32 of the light emitting assembly 30 surrounds the display panel 20, as shown in FIG. 4A.

The touch layer 29 may be an externally-applied glass-based touch layer, touch film, or touch electrodes integrated on the upper surface of the second substrate 28. The first substrate 21 and the second substrate 28 may be of alkali-free glass for general display or a highly transparent polyimide film. The material system of the liquid crystal layer 25 may be a polymer-stabilized liquid crystal containing at least a liquid crystal with high refractive index difference, a polymer monomer, and a photo initiator mixed in certain proportions. Each material may not be limited to any specific material but may be a mixture of a plurality of materials. Generally, the content of the polymer monomer is not more than 10%. The polymer-stabilized liquid crystal is poured into the liquid crystal cell by drip injection or vacuum injection. UV irradiation is then carried out to complete the preparation of the liquid crystal cell.

Optionally, the display panel 20 is a field sequential liquid crystal display panel, and the liquid crystal is a polymer-stabilized liquid crystal. The field sequential display panel made of the polymer-stabilized liquid crystal can be matched with the light emitting assembly 30 in the embodiment, so that the light transmittance of the display panel is better. The field sequential display panel made of the polymer-stabilized liquid crystal also provides faster response.

Figure 4A:
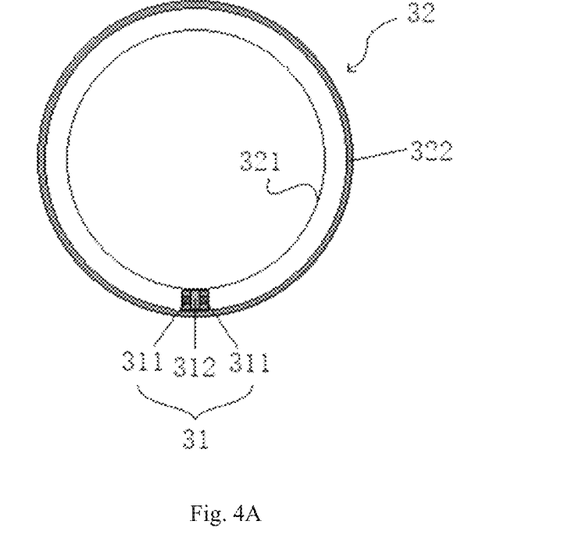
FIG. 4A is a schematic structural view of a light guiding structure according to an embodiment.

FIG. 4A shows the light emitting assembly 30 according to an embodiment.

The light emitting assembly 30 includes a light source 31 and a light guiding structure 32. The light source 31 is disposed in the light guiding structure 32. The light guiding structure 32 is circumferentially disposed around the display panel 20 for introducing or guiding light emitted from the light source 31 into the display panel 20. The light guiding structure 32 is provided with a light emitting surface 321 at a portion facing the display panel 20. Except the light emitting surface 321, other portions of the light guiding structure 32 are provided with a light reflecting layer 322, as shown in FIG. 4C. That is, the light reflecting layer 322 may be located at a portion facing away from the display panel.

Optionally, the thickness of the liquid crystal layer 25 is about 2 to 10 μm; the overall thickness of the liquid crystal cell is about 0.1 to 2 mm; and the light guiding structure 32 matches the thickness of the liquid crystal cell, and is also about 0.1 to 2 mm.

Figure 4B:
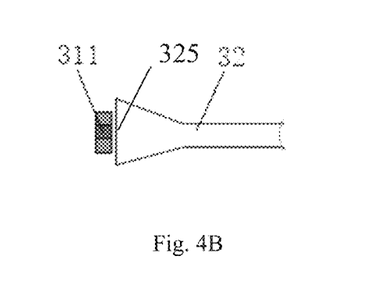
FIG. 4B is a schematic cross-sectional structural view of a boundary portion between a light guiding structure and a light source according to an embodiment.
Figure 4C:
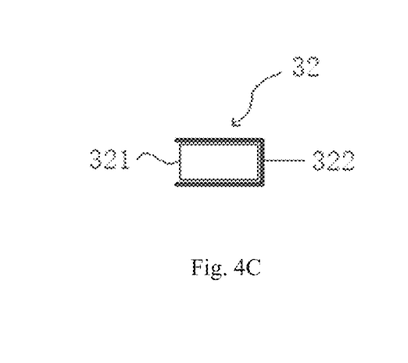
FIG. 4C is a schematic cross-sectional view of alight guiding structure according to an embodiment.

In order to improve the light entering efficiency, the light guiding structure 32 is equivalent in size to the light emitting device 311 at the junction with the light emitting device 311, as shown in FIG. 4B.

In some embodiments, the light guiding structure 32 has a light incident surface 325 and the light source is configured to emit light into the light guiding structure 32 through the light incident surface 325.

Optionally, the light guiding structure 32 is made of polymethyl methacrylate that is used in optical systems and is easy to process.

Optionally, the light reflecting layer 322 is disposed on the outer side, and the upper and lower sides of the light guiding structure 32. When the light propagates in the light guiding structure 32 and reaches the light reflecting layer 322, the light is reflected by the light reflecting layer 322 and enters the liquid crystal layer 25 through the light emitting surface 321, thereby improving the light source utilization rate and the brightness of the display.

Figure 4D:
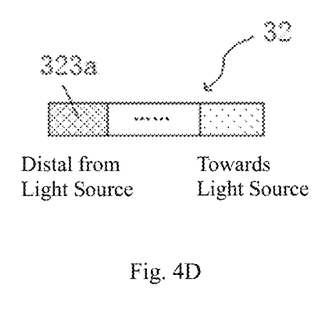
FIG. 4D is a schematic view of light extraction dots according to an embodiment.
Figure 4E:
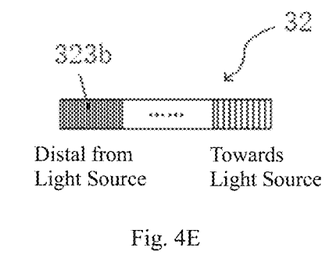
FIG. 4E is a schematic view of light extraction gratings according to an embodiment.

In some embodiments, on a contact side of the light guiding structure 32 and the display panel 20, that is, the light emitting surface 321 of the light guiding structure 32, a light extraction structure 323a/323b may be provided, and the light extraction structure may be dots 323a (as shown in FIG. 4D), or a grating 323b for collimating light (as shown in FIG. 4E).

Optionally, the distribution density of the light extraction structures 323a/323b increases as the distance from the light source 31 increases. The distribution density of the light extraction structures 323a/323b increases as the distance from the light source increases, so that the light extraction structure near the light source is sparsely distributed, and the light extraction structure away from the light source is densely distributed, thereby achieving uniform light emission. The specific density distribution may be set as needed.

Optionally, in order to improve the light extraction efficiency of the display panel 20, a light extraction structure having a light collimation effect is used.

In an embodiment, the light emitting assembly 30 includes the light source 31 and the light guiding structure 32, and the light source 31 is disposed at at least one portion of the light guiding structure 32. In an embodiment shown in FIG. 4A, the light source 31 includes two light emitting devices 311 (for example, LEDs) disposed facing away from each other such that light emitted by the two light emitting devices 311 propagates in opposite directions, thereby increasing the light intensity distribution inside the light guiding structure 32.

Optionally, a heat dissipation layer 312 is disposed between the two light emitting devices 311 to better dissipate the heat generated by the light emitting devices 311.

Figure 5A:
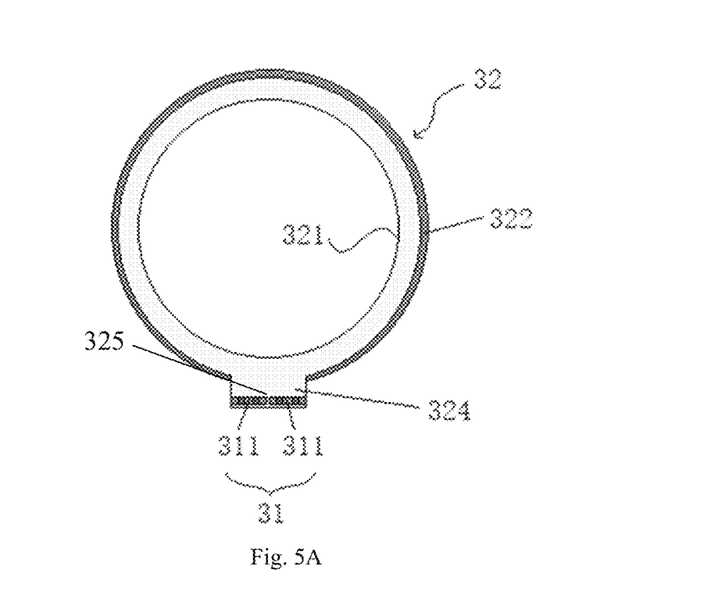
FIG. 5A is a schematic structural view of a light guiding structure according to an embodiment.

In another embodiment shown in FIG. 5A, the light guiding structure 32 has at least one protrusion 324 in which the light source 31 is disposed. The structural design can avoid the problem that no light is emitted at the contact position of the two light emitting devices facing away from each other (as shown in FIG. 4A), and also can reduce the design complexity.

Optionally, the light source 311 may include two light emitting devices 311 arranged side by side, as shown in FIG. 5A. It is appreciated that the number of the light emitting devices 311 may vary, and may be set according to actual needs.

Figure 5B:
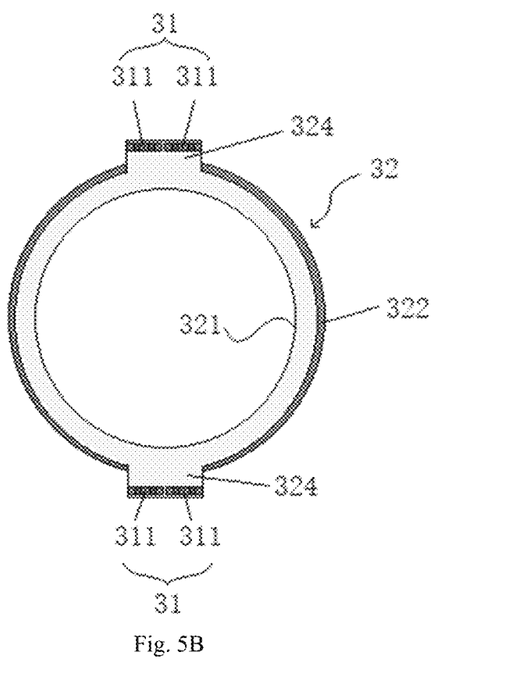
FIG. 5B is a schematic structural view of a light guiding structure according to an embodiment.

In some embodiments, as shown in FIG. 5B, the light guiding structure 32 has two protrusions 324, and the two protrusions 324 are symmetrically disposed with respect to the light guiding structure 32, to improve light intensity and light uniformity.

In some embodiments, the light guiding structure 32 includes at least one protrusion; the light incident surface 325 is a surface of the at least one protrusion; and the light source is in proximity to the light incident surface 325.

The density of the light extraction structure in the light guiding structure 32 shown in FIG. 5A and FIG. 5B may be designed with reference to the design of FIG. 4D and FIG. 4E.

Figure 6A:
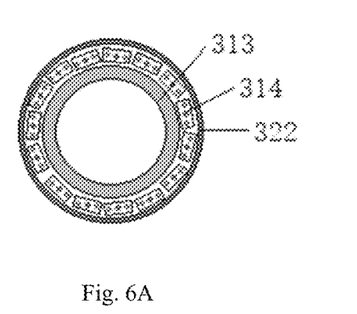
FIG. 6A is a schematic structural view of a light guiding structure according to an embodiment.

In an embodiment shown in FIG. 6A, the light source 31 includes an annular light strip or a ring light strip and an optical film layer 313, the annular light strip being disposed inside the light guiding structure 32, and the optical film layer 313 being disposed between the annular light strip and the display panel 20. This design has the advantage that the brightness of the light source can be higher due to the use of an annular light strip. At the same time, with this design, uniform light incidence may be achieved by the uniformization, incremention and collimation via the optical film layer 313, so that a light extraction structure is not required. In an example, the display panel is circular or round, and the light incident surface is a surface of the light guiding structure distal to the display panel. The ring light strip is disposed in proximity to the light incident surface of the light guiding structure and surrounds the display panel.

Figure 6B:
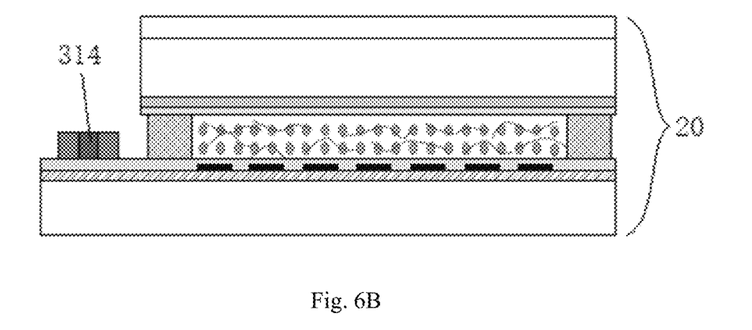
FIG. 6B is a schematic structural view of a light emitting chip disposed on a substrate of a display panel according to an embodiment.

Optionally, as shown in FIG. 6A and FIG. 6B, the annular light strip includes a plurality of light emitting chips 314 (such as Mini RGB chips or Micro RGB chips), and the light emitting chips 314 are integrated on the substrate of the display panel 20, thereby improving the integration of the light source and the display panel.

Figure 7A:
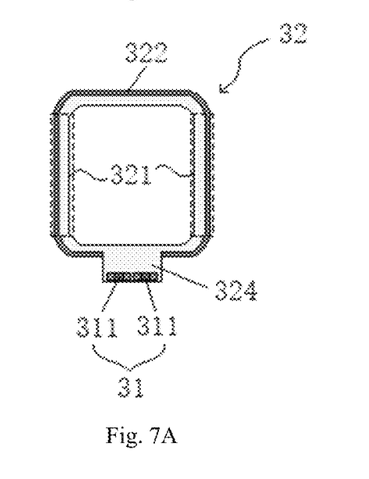
FIG. 7A is a schematic structural view of a light guiding structure according to an embodiment.

In an embodiment of the present disclosure, the geometry of the light guiding structure corresponds to the display panel. The light guiding structure 32 in the above embodiments is annular, and the display panel 20 is round. The side of the light guiding structure 32 that is in contact with the display panel 20 is the light emitting surface 321. When the display panel 20 is square or rectangular, as shown in FIG. 7A, the shape of the light guiding structure 32 is correspondingly square or rectangular. In this case, the four sides of the light guiding structure 32 facing the display panel 20 are in contact with the four sides of the display panel 20 respectively. Two out of the four sides of the light guiding structure 32 facing the display panel 20 that are symmetrically disposed are the light emitting surface 321 (corresponding to the portion of the light guiding structure 32 in the broken line in FIG. 7A). Since the incident direction of the light source needs to be perpendicular to the alignment direction of the liquid crystal, only two symmetrical planes may be selected as the light emitting surface 321, and light in other directions contributes little to the brightness of the display panel. It can be understood that, although the embodiment adopts a structure in which the two light emitting surfaces are symmetrically disposed, in practice, light emitting surfaces may be disposed on four sides at a portion where the light guiding structure 32 and the display panel 20 are in contact with each other.

Figure 7B:
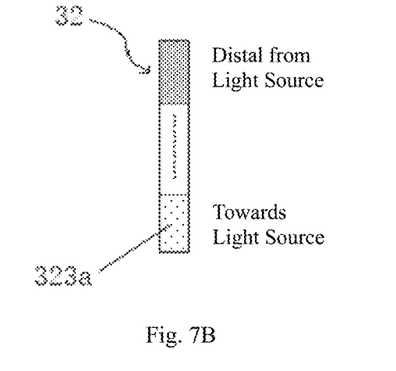
FIG. 7B is a schematic view of light extraction dots according to an embodiment.
Figure 7C:
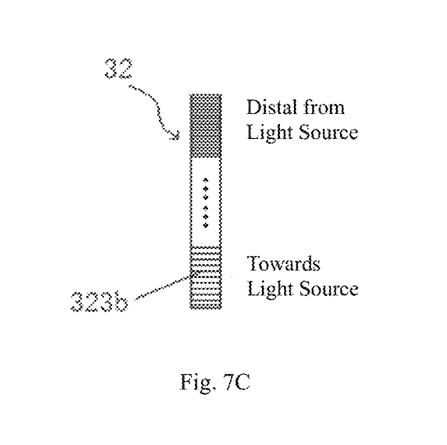
FIG. 7C is a schematic view of light extraction gratings according to an embodiment.

In addition, similar to other embodiments, in the embodiment of the square or rectangular light guiding structure 32 and the display panel 20, on the contact side of the light guiding structure 32 and the display panel 20, that is, on the light emitting surface 321 of the light guiding structure 32, a light extraction structure 323a/323b is provided, and the light extraction structure may be dots 323a (as shown in FIG. 7B) or a grating 323b having a light collimation effect (as shown in FIG. 7C). The distribution density of the light extraction structures 323a/323b increases as the distance from the light source 31 increases. The distribution density of the light extraction structures 323a/323b increases as the distance from the light source increases, so that the light extraction structure near the light source is sparsely distributed, and the light extraction structure away from the light source is densely distributed, thereby achieving uniform light emission. The specific density distribution may beset as needed. Further, in order to improve the light extraction efficiency of the display panel 20, a light extraction structure having a light collimation effect may be preferred.

The light source 31 shown in FIG. 7A is arranged in such a manner that a protrusion 324 is provided on the light guiding structure 32, and the light source 31 is disposed in the protrusion 324. It can be understood that, according to the light source arranging manners described above, in addition to the specific light source arrangement shown in FIG. 7A, the light source 31 may be disposed in the transmission channel of the light guiding structure 32 and adopt two light emitting devices 311 disposed facing away from each other. Alternatively, a set of light sources may be disposed at symmetrical portions of the light guiding structure 32. These variations are equally applicable to the square and/or rectangular light guiding structure 32 and the display panel 20.

Figure 7D:
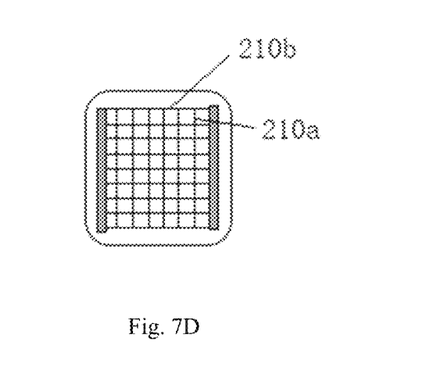
FIG. 7D is a schematic diagram of signal lines layout of a display panel according to an embodiment.

Optionally, the signal lines of the display panel 20 are transparent wires. As shown in FIG. 7D, the signal lines include a scan line 210a and a drive line 210b. The signal lines are made of transparent wires, which can improve the transmittance and reduce the metal reflection perpendicular to the direction of the light source, especially when the resolution of the display screen is not high.

By arranging the light guiding structure 32 around the display panel 20, the display panel can realize the incidence of the backlight based on the waveguide principle, and thus the transmittance is high which may reach 80% to 90%; the response speed is fast, which may reach 1 ms~2 ms; and the color display can be realized by field sequential technology, and thus is advantageous in transparent display.

The display panel is transparent in a non-displaying state in which the main body is viewable by a user. After a voltage is applied, e.g., by the driving circuit 50, the liquid crystal is inverted accordingly, and the liquid crystal orientation is disordered by the traction of the polymer network, thereby displaying by scattering. When there is ambient light, the displayed content may be seen without backlight. If the ambient light is not in a good condition, or if a color display is required, a light source is required. The polymer-stabilized liquid crystal system, after being driven by a voltage, has a fast response speed, which may reach 1 to 2 ms. The color display maybe realized by field sequential light source technology.

The wearable device according to the embodiments of the present disclosure generally has three modes of operation.

Figure 8A:
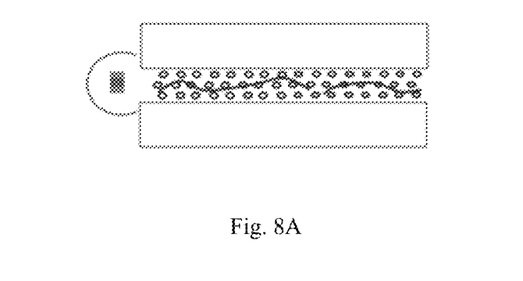
FIG. 8A is a schematic diagram showing the display principle of mode 1 according to an embodiment.
Figure 8B:
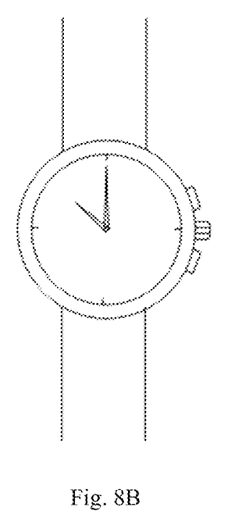
FIG. 8B is a schematic diagram of a display in mode 1.

Mode 1: As shown in FIG. 8A, in this mode, the light source is turned off; the liquid crystal cell is not applied with a voltage; and the display panel 20 is in an off state. That is, the display panel 20 is in a transparent state and does not display an image. Therefore, the function of the main body 10 itself is displayed. For example, the traditional dial and hands of the smart watch are viewable by a user to show time, and since the transmittance of the waveguide display panel is 80%~90%, the hands of the watch are clearly visible, as shown in FIG. 8B. In this mode, the display panel 20 is in a transparent non-displaying state in which the main body is viewable by a user.

Figure 9A:
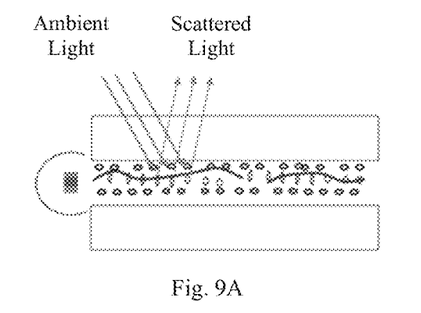
FIG. 9A is a schematic diagram showing the display principle of mode 2 according to an embodiment.
Figure 9B:
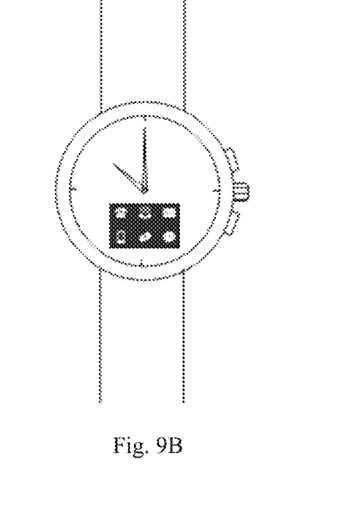
FIG. 9B is a schematic diagram of a display in mode 2.

Mode 2: As shown in FIG. 9A, in the case of sufficient ambient light, the light source is turned off; only the display screen is turned on; the liquid crystal cell is applied with a voltage, for example, by the driving circuit 50; and the liquid crystal cell scatters ambient light, which can display black and white images. This may be especially useful for displaying images for the sensors or other functional modules, as shown in FIG. 9B. In this mode, the display panel 20 is in a non-backlighted displaying state in which the information is displayed in black-and-white.

Figure 10A:
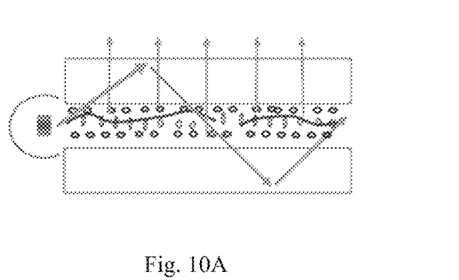
FIG. 10A is a schematic diagram showing the display principle of mode 3 according to an embodiment.

Mode 3: As shown in FIG. 10A, the light source is turned on; the liquid crystal cell is applied with a voltage; and the liquid crystal cell scatters the light incident from the light source through the light guiding structure, and the display screen can display a color image. In this mode, the display panel 20 is in a backlighted displaying state in which the information is displayed with color.

In mode 2 and mode 3, the display panel 20 is in a displaying state in which the information displayed is viewable by the user. The driving circuit 50 controls the display panel 20 to switch between the transparent non-displaying state in which the main body is viewable by a user (mode 1) and the displaying state in which the information displayed is viewable by the user (mode 2 and mode 3). The displaying state includes the non-backlighted displaying state of mode 2 and the backlighted displaying state of mode 3.

In operation, the display panel 20 is switchable among the three states.

According to some embodiments of the present disclosure, there is provided a method for controlling a wearable device, the wearable device including a main body; a display panel over the main body for displaying information; and a driving circuit coupled to the display pane, where the method includes controlling the display panel to switch between: a transparent non-displaying state in which the main body is viewable by a user, and a displaying state in which the information displayed is viewable by the user.

Figure 10B:
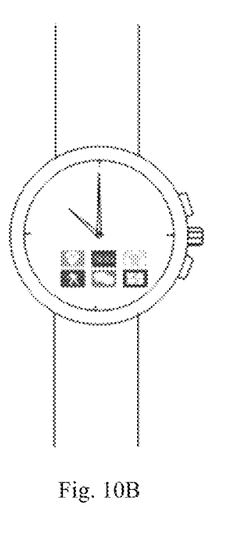
FIG. 10B is a schematic diagram of a display in mode 3.

It should be noted that the position of the display can be designed according to the function display part of the main body 10. The display panel may include a first region for displaying the information in the displaying state; and a second region that remains transparent in the displaying state. For example, for a smart watch incorporating a conventional watch, if the hands of the conventional watch are in the upper part (e.g. the upper half) of the main body (as shown in FIGS. 9B and 10B), the information or any digital contents maybe displayed in the lower part (e.g. the lower half) of the display panel, enabling simultaneous display of both traditional and smart functions.

It can be seen that the wearable device according to the embodiments integrates the waveguide liquid crystal transparent display panel with the ordinary watch. When the special function is not needed, the display module is turned off, and only the ordinary watch works to showtime; and when the smart function is needed, the display module is turned on as an interactive interface. By adjusting the design of the light source and the display module, the effect of the display is ensured while retaining the function and texture of the traditional watch, thereby greatly enhancing the experience of the smart watch.

Various embodiments and/or examples are disclosed to provide exemplary and explanatory information to enable a person of ordinary skill in the art to put the disclosure into practice. Features or components disclosed with reference to one embodiment or example are also applicable to all embodiments or examples unless specifically indicated otherwise.

Although the disclosure is described in combination with specific embodiments, it is to be understood by the person skilled in the art that many changes and modifications may be made and equivalent replacements may be made to the components without departing from a scope of the disclosure. Embodiments may be practiced in other specific forms. The described embodiments are to be considered in all respects only as illustrative and not restrictive.

The invention claimed is:

1. A wearable device, comprising:
    a main body;
    a display panel over the main body for displaying information; and
    a driving circuit coupled to the display panel;
    wherein the driving circuit is configured to control the display panel to switch between: a transparent non-displaying state in which the main body is viewable by a user, and a displaying state in which the information displayed is viewable by the user; and
    wherein the display panel comprises: a first region for displaying the information in the displaying state; and a second region that remains transparent in the displaying state.

2. The wearable device according to claim 1, wherein the displaying state further comprises:
    a non-backlighted displaying state in which the information is displayed in black-and-white; and
    a backlighted displaying state in which the information is displayed with color.

3. The wearable device according to claim 1, wherein the main body is a wrist watch.

4. The wearable device according to claim 1, further comprising a light emitting assembly, wherein the light emitting assembly includes a light source, and the light source is configured to illuminate the display panel.

5. The wearable device according to claim 4, wherein the light emitting assembly further comprises a light guiding structure having a light incident surface; the light source is configured to emit light into the light guiding structure through the light incident surface; and the light guiding structure is located at an edge of the display panel and is configured to guide the light emitted by the light source to illuminate the display panel.

6. The wearable device according to claim 5, wherein the light guiding structure surrounds an outer edge of the display panel.

7. The wearable device according to claim 1, wherein the display panel is a field sequential liquid crystal display panel, and the liquid crystal is a polymer-stabilized liquid crystal.

8. The wearable device according to claim 5, wherein the light guiding structure comprises a light emitting surface at a portion facing the display panel, and a light reflecting layer at a portion facing away from the display panel.

9. The wearable device according to claim 8, wherein the light emitting surface of the light guiding structure is provided with a light extraction structure, and a distribution density of the light extraction structure increases as a distance from the light source increases.

10. The wearable device according to claim 9, wherein the light extraction structure comprises dots or gratings.

11. The wearable device according to claim 4, wherein the light source comprises two light emitting devices disposed facing away from each other.

12. The wearable device according to claim 11, wherein a heat dissipation layer is disposed between the two light emitting devices.

13. The wearable device according to claim 5, wherein the light guiding structure comprises at least one protrusion; the light incident surface is a surface of the at least one protrusion; and the light source is in proximity to the light incident surface.

14. The wearable device according to claim 13, wherein the light guiding structure has two protrusions, and the two protrusions are symmetrically disposed with respect to the light guiding structure.

15. The wearable device according to claim 5, wherein the display panel is round; the light source comprises a ring light strip and an optical film layer; the light incident surface is a surface of the light guiding structure distal to the display panel; the ring light strip is disposed in proximity to the light incident surface of the light guiding structure and surrounds the display panel; and the optical film layer is disposed between the ring light strip and the display panel.

16. The wearable device according to claim 15, wherein the ring light strip comprises a plurality of light emitting chips integrated on a substrate of the display panel.

17. The wearable device according to claim 5, wherein the display panel is square or rectangular; the light guiding structure has a corresponding shape of square or rectangular and has four sides facing the display panel; and two of the four sides of the light guiding structure facing the display panel that are symmetrically disposed are light emitting surfaces.

18. The wearing device according to claim 1, wherein the display panel comprises signal lines that are transparent wires; or the display panel is a touch sensitive display panel.

19. A method for controlling a wearable device, wherein the wearable device comprises:
 a main body;
 a display panel over the main body for displaying information; and
 a driving circuit coupled to the display panel,
 wherein the method comprises:
 controlling the display panel to switch between: a transparent non-displaying state in which the main body is viewable by a user, and a displaying state in which the information displayed is viewable by the user, wherein the display panel comprises: a first region for displaying the information in the displaying state; and a second region that remains transparent in the displaying state.

* * * * *